Oct. 15, 1940.  H. R. MEYER  2,218,048

CAM POSITION INDICATOR

Filed Feb. 7, 1939　　2 Sheets-Sheet 1

Inventor
Harry R. Meyer.

By Clarence A. O'Brien
and Hyman Berman
Attorneys

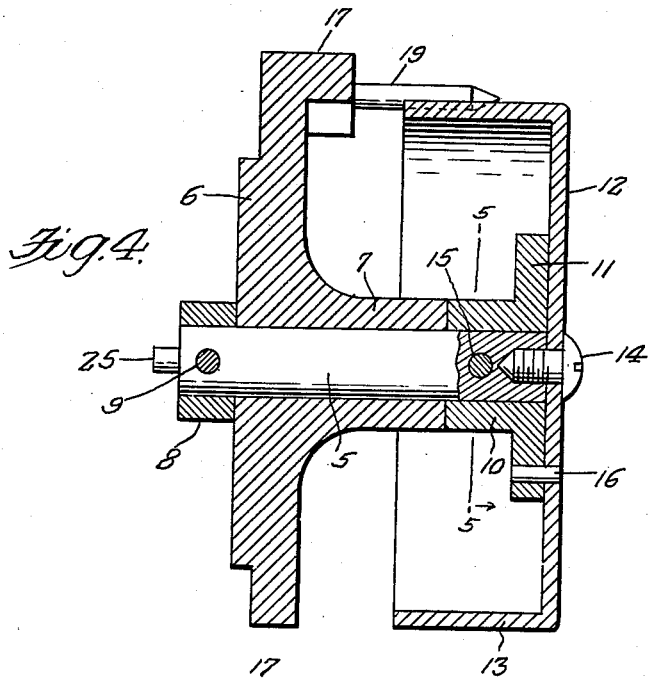
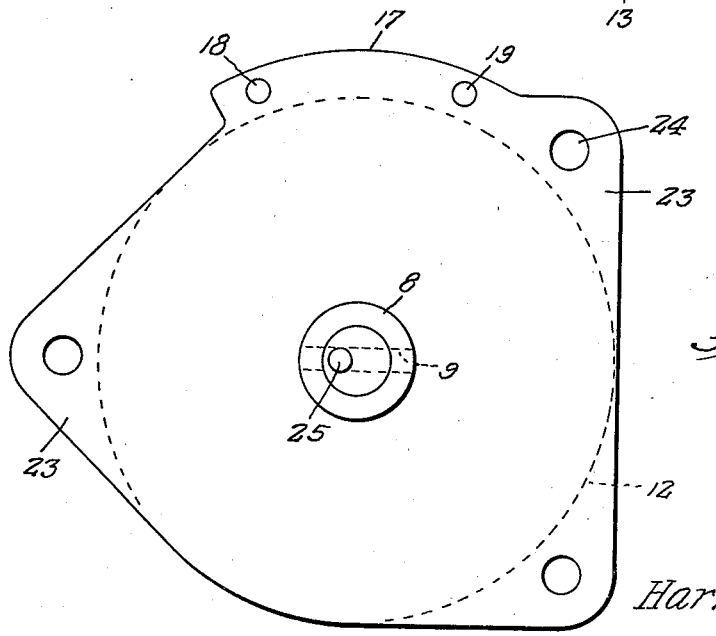

Patented Oct. 15, 1940

2,218,048

UNITED STATES PATENT OFFICE 2,218,048

CAM POSITION INDICATOR

Harry R. Meyer, Santa Barbara, Calif.

Application February 7, 1939, Serial No. 255,173

1 Claim. (Cl. 116—124)

This invention appertains to new and useful improvements in cam position indicators for V-type internal combustion engines such as are used on Ford make motor cars.

The principal object of the present invention is to provide a position indicator for accurately setting the cam shaft cams in the operation of valve grinding and setting clearance between the lifters and valves on Ford V-type automobile engines.

Another important object of the invention is to provide a cam position indicator which can be conveniently secured to the cam shaft gear cover in place of the usual ignition distributor.

Still another important object of the invention is to provide a cam position indicator which will give the correct position for grinding and setting each individual valve.

These and other important objects and advantages of the invention will become apparent to the reader of the following specification.

In the drawings—

Figure 3 is a rear elevational view.

Figure 4 is a section on line 4—4 of Figure 1.

Figure 1:
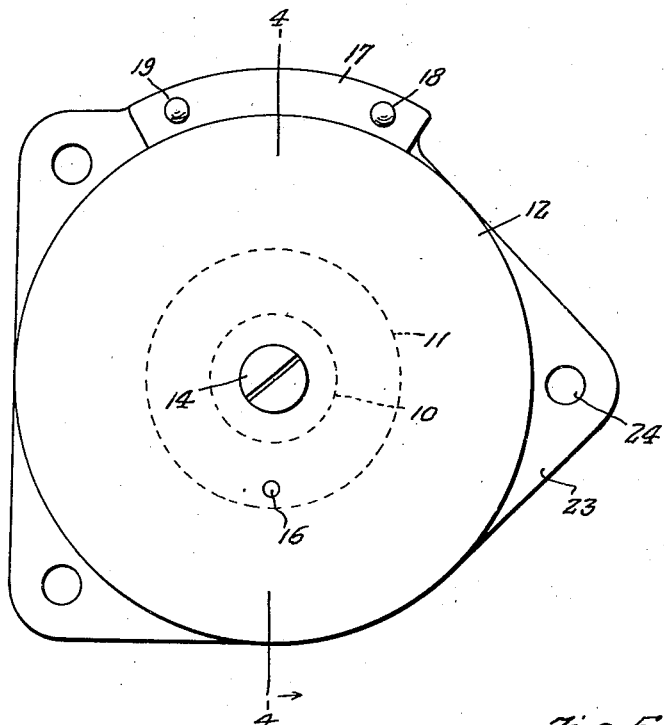
Figure 1 represents a front elevational view.
Figures 2, 5:
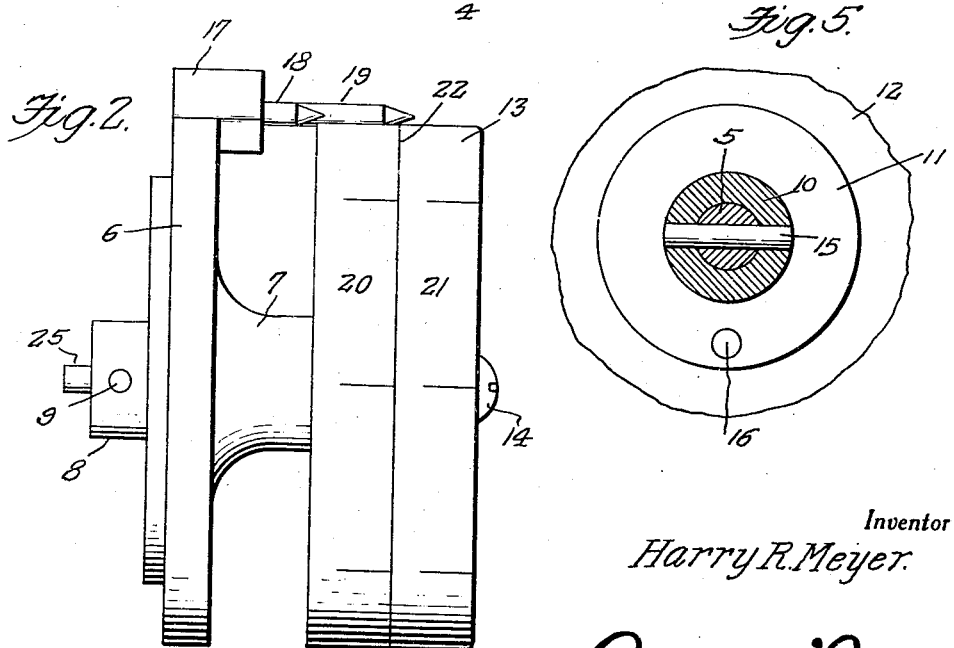
Figure 2 is a side elevational view.
Figure 5 is a sectional view on line 5—5 of Figure 4.

Referring to the drawings wherein like numerals designate like parts, it can be seen that numeral 5 represents a short shaft on which is the plate 6, the same having the hub extension 7 forming a bearing for the shaft 5. A collar 8 is provided on one end of the shaft and is secured in place by the cross pin 9 and this serves to hold the shaft 5 against end play in one direction in hub 7. End play of the shaft 5 in the opposite direction is prevented by a collar 10 thereon, which collar has the circumferentially extending flange 11 abutting the front wall 12 of the indicating drum 13 which is secured to the other end of the shaft 5 so as to center the drum 13 relative thereto by the machine screw 14 as clearly shown in Figure 4. A cross pin 15 passes through the collar 10 and shaft 5 to secure the collar to the said shaft for rotation thereby. A pin 16 is extended through the flange 11 of collar 10 and front wall of the drum 13 to form a driving connection between said flange and drum independent of the screw 14 so as to prevent the screw from working loose under rotation of said drum.

A boss 17 on the plate 6 has projecting therefrom the right side indicating pin 18 and the left side indicating pin 19 each of which is provided with a tapered extremity, with the pin 18 pointing to the scale area 20 on the drum 13 and the pin 19 pointing to the scale area 21 on the drum 13, these areas being separated by the dividing line 22.

Webs or flanges 23 extend from the plate 6 and have bolt holes 24 therein through which bolts can be disposed for securing the plate in proper position.

An offset key 25 protrudes from the rear end of the collar 8 for engagement with the cam shaft.

As the indicating pin 18 aligns with graduation lines on the drum marked according to cam shaft rotation, the cams of the cam shaft are in the correct position for grinding and setting valve clearance on the right side of the engine.

The same facility is afforded in regard to the use of the indicating pin 19 in conjunction with the gauge area 21.

This cam position indicator permits the operation of valve grinding with piston assemblies either in or out of the engine. All of the valves can be ground and the valves clearance set on right and left sides of the engine, beginning with number one valve and working back in rotation to number eight valve, thus eliminating the necessity of the mechanic working first on one side of the engine and completing part of the valve grinding operation and next performing another part on the opposite side.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

An indicator for attachment to the cam shaft gear case cover of a V type automobile engine to gauge the position of the cams on opposite sides thereof for valve grinding operations, said indicator comprising a bearing plate adapted to be attached to said cover and having a forwardly extending central hub, an operating shaft journaled in said hub and having a rear end adapted for connection to said cam shaft for rotation thereby, a flanged bushing fast on said operating shaft in front of the hub and abutting the latter, a drum on the front end of said operating shaft surrounding the bushing, a pin extending from the flange of said bushing through said drum and forming a driving connection between the bushing and drum, a pair of circumferentially extending front and rear scales on the periphery of the drum for indicating the position of the cams on opposite sides of the engine, respectively, and a pair of laterally spaced pointer pins of different lengths extending forwardly from said plate over said drum for overlying said front and rear scales, respectively.

HARRY R. MEYER.